(12) United States Patent
Rai et al.

(10) Patent No.: US 12,153,906 B2
(45) Date of Patent: Nov. 26, 2024

(54) METHOD AND SYSTEM FOR GENERATING ENGINEERING DESIGNS IN AN ENGINEERING SYSTEM

(71) Applicant: Siemens Aktiengesellschaft, Munich (DE)

(72) Inventors: Himanshu Rai, Bangalore (IN); Elvis Antony, Karnataka (IN); Aneesh Kumar R, Karnataka (IN)

(73) Assignee: Siemens Aktiengesellschaft, Munich (DE)

( * ) Notice: Subject to any disclaimer, the term of this patent is extended or adjusted under 35 U.S.C. 154(b) by 92 days.

(21) Appl. No.: 17/920,824

(22) PCT Filed: Apr. 30, 2021

(86) PCT No.: PCT/EP2021/061454
§ 371 (c)(1),
(2) Date: Oct. 24, 2022

(87) PCT Pub. No.: WO2021/219874
PCT Pub. Date: Nov. 4, 2021

(65) Prior Publication Data
US 2023/0161566 A1 May 25, 2023

(30) Foreign Application Priority Data
Apr. 30, 2020 (EP) ..................................... 20172367

(51) Int. Cl.
*G06F 8/34* (2018.01)
*G06F 8/35* (2018.01)

(52) U.S. Cl.
CPC . *G06F 8/34* (2013.01); *G06F 8/35* (2013.01)

(58) Field of Classification Search
CPC ..................................... G06F 8/34; G06F 8/35
(Continued)

(56) References Cited

U.S. PATENT DOCUMENTS 7,424,701 B2 * 9/2008 Kendall ................. G06N 5/027
717/109
8,495,559 B2 * 7/2013 Akkiraju ................... G06F 8/35
717/136
(Continued)

OTHER PUBLICATIONS

Fill, Hans-Georg. "SeMFIS: a flexible engineering platform for semantic annotations of conceptual models." Semantic Web 8.5 (2017): pp. 747-763. (Year: 2017).*
(Continued)

*Primary Examiner* — Satish Rampuria
(74) *Attorney, Agent, or Firm* — Schmeiser, Olsen & Watts LLP (57) ABSTRACT

A method and system for generating engineering designs in an engineering system is provided. The method includes receiving an engineering design of a technical installation. Further, the method includes generating an object behavior model of the one or more engineering objects based on an ontology schema. Also, the method includes analyzing behavior of the one or more engineering objects based on the generated object behavior model. Furthermore, the method includes modifying the one or more engineering objects in the engineering design based on the outcome of analysis of the behavior. Additionally, the method includes outputting the modified engineering design of the technical installation.

7 Claims, 7 Drawing Sheets

(58) Field of Classification Search
USPC .................................................. 717/106–178
See application file for complete search history.

(56) References Cited

U.S. PATENT DOCUMENTS

| | | | |
|---|---|---|---|
| 2010/0077386 A1* | 3/2010 | Akkiraju | G06F 8/36 |
| | | | 717/136 |
| 2012/0143570 A1* | 6/2012 | Austin | G06Q 10/00 |
| | | | 703/1 |
| 2016/0026441 A1* | 1/2016 | Diez | G06F 16/367 |
| | | | 717/104 |
| 2017/0286456 A1* | 10/2017 | Wenzel | G16H 10/20 |
| 2022/0083926 A1* | 3/2022 | Miller | G06Q 10/06395 |

OTHER PUBLICATIONS

Mizoguchi, Riichiro. "Tutorial on ontological engineering Part 2: Ontology development, tools and languages." New Generation Computing 22.1 (2004): pp. 61-96. (Year: 2004).*

Kunz, John, and Martin Fischer. "Virtual design and construction: themes, case studies and implementation suggestions." Center for Integrated Facility Engineering, Stanford University (2012): pp. 1-53. (Year: 2012).*

Lee, Jae H., et al. "A semantic product modeling framework and its application to behavior evaluation." IEEE Transactions on Automation Science and Engineering 9.1 (2011): pp. 110-123. (Year: 2011).*

Freitas, Artur, Rafael H. Bordini, and Renata Vieira. "Model-driven engineering of multi-agent systems based on ontologies." Applied Ontology 12.2 (2017): pp. 157-188. (Year: 2017).*

Wicaksono, Hendro, et al. "Ontology development towards expressive and reasoning-enabled building information model for an intelligent energy management system." International Conference on Knowledge Engineering and Ontology Development. vol. 2. SciTePress, 2013.pp. 38-47 (Year: 2013).*

International Search Report for PCT/EP2021/061454 issued on Jun. 15, 2021.

Written Opinion for PCT/EP2021/061454 issued on Jun. 15, 2021.

Wawrzik Frank et al: "A concept for design of embedded systems at semantic level", Proceedings of the 2013 Forum on Specfication and Design Languages (FDL). European Electronic Chips & Systems Design Initiative—ECSI, vol. 978-2-9530504-9-3, Oct. 14, 2014 (Oct. 14, 2014).

* cited by examiner

METHOD AND SYSTEM FOR GENERATING ENGINEERING DESIGNS IN AN ENGINEERING SYSTEM

CROSS-REFERENCE TO RELATED APPLICATIONS

This application claims priority to PCT Application No. PCT/EP2021/061454, having a filing date of Apr. 30, 2021, which claims priority to EP application Ser. No. 20172367.3 having a filing date of Apr. 30, 2020, the entire contents both of which are hereby incorporated by reference.

FIELD OF TECHNOLOGY

The following relates to a field of engineering of technical installations, and more particularly relates to a method and system for generating engineering designs in an engineering system.

BACKGROUND

An engineering system provides a platform for generating engineering design representing one or more physical components, physical connections between the one or more physical components in a technical installation and corresponding parameter values of the one or more physical components and the physical connections. The one or more physical components may include, for example, a programmable logic controller, one or more field devices, or any other automation devices. The engineering design may include engineering objects representing the one or more physical components and the physical connections between the one or more physical components.

Typically, in order to generate an engineering design in the engineering system, a code developer may have to write several graphical programs for each of the one or more physical components, the corresponding parameter values, and the physical connections and the corresponding parameter values. Accordingly, the engineering systems provide users with a program editor in order to generate such graphical programs (by dragging and dropping desired graphical program blocks from an element library). Later, the engineering design generated in the program editor are compiled and downloaded onto the one or more physical components such as a programmable logic controller (PLC) used for industrial control applications.

Conventional engineering systems employ functions and other resources to provide assistance to the code developers in designing and implementing engineering designs related to the technical installation. However, these conventional engineering systems lack automated engineering methods that generate engineering designs on the engineering systems. For instance, when using an unfamiliar library in the engineering system in order to generate an engineering design, a code developer cannot receive automated guidance from the conventional engineering system for best coding practices. Also, the code developer may not receive further automated guidance to optimize use of such library and automatically generate desired engineering design. In particular, conventional engineering systems do not provide automated programming assistance by offering guidance or suggestions to enhance the quality of code that is written by the code developer. Hence, there are no mechanisms to automate engineering involved in generating engineering designs.

Another instance is, when the code developer requires to reverse or rewrite an erroneous code in order to regenerate an engineering design, the conventional engineering systems allows the code developer to perform 'rewrite or redo' functions step by step which consumes huge amount of time. Also, when the code developer would like to reuse a particular set of code written in different programming language than the one being currently used, the conventional engineering system does not support integration of different programming languages while developing a particular code. This may restrict reusability of already developed code with a similar programming logic.

In light of above, there exists a need for an efficient method and system for generating engineering designs in engineering systems.

SUMMARY

An aspect relates to a method and system for generating engineering designs in engineering systems.

An aspect of embodiments of the invention is achieved by a method for generating engineering designs in an engineering system. The method comprises receiving an engineering design of a technical installation. The engineering design comprises one or more engineering objects representing one or more physical components in the technical installation. The one or more engineering objects comprises one or more physical components in a portion of the technical installation, physical connections between the one or more physical components, and a plurality of parameter values associated with the one or more physical components and the physical connections. The engineering objects comprises information related to the one or more physical components, physical connections between the one or more physical components, and a plurality of parameter values associated with the one or more physical components and the physical connections. The one or more physical components comprises servers, robots, switches, automation devices, programmable logic controllers (PLC)s, human machine interfaces (HMIs), motors, valves, pumps, actuators, sensors and other industrial equipment(s) and the like. The physical connections may be a physical link (such as wirings or cables). In an alternate embodiment, the connections may also be a virtual link. The plurality of parameter values comprises motor configuration parameters, network and communication parameter, valve controls, temperature or pressure values of a sensor, speed, torque and the like. In an exemplary embodiment, the representation may be an ontology based graphical representation of the technical installation comprising graphical program blocks. The graphical program blocks correspond to one or more graphical programs. The technical installation may be an industrial plant.

Further, the method comprises generating an object behavior model of the one or more engineering objects based on an ontology schema. The object behavior model is a knowledge graph based representation of the one or more engineering objects superimposed with one or more behavioral information associated with the one or more engineering objects. Further, the method comprises analyzing behavior of the one or more engineering objects based on the generated object behavior model.

Furthermore, the method comprises modifying the one or more engineering objects in the engineering design based on the outcome of analysis of the behavior. The modifications comprise any changes such as addition, deletion, update, replacement or revision of one or more physical components, physical connections between the one or more physical components, and a plurality of parameter values associated with the one or more physical components and the physical connections. The outcome of analysis of the behavior may be a behavior report indicating whether behavior or characteristic of each engineering objects as defined in the object behavior model is acceptable, improvised, enhanced, optimized or the like. Also, the method comprises outputting the modified engineering design of the technical installation.

In generating the object behavior model of the one or more engineering objects based on the ontology schema, the method comprises identifying one or more engineering objects based on type of the one or more physical components, one or more physical connections between the one or more physical components, and a plurality of parameter values associated with the one or more physical components and the physical connections. The type of the one or more physical components may be functional, process, software component and the like. Further, the method comprises classifying the identified one or more engineering objects into one or more engineering object blocks based on a unique identifier associated with each of the one or more identified engineering objects. The one or more engineering object blocks may correspond to one or more engineering block category. The one or more engineering block category comprises basic block, variable/symbol and the statement category. Also, the method comprises determining one or more engineering object properties associated with each of the classified one or more engineering objects. The object properties are object's domain context, association and relationship with other engineering objects, object size, object identifier, type of engineering object, and the like. Furthermore, the method comprises determining relationship between each of the one or more classified engineering objects based on the ontology schema table. The relationship may be direct relationship between the engineering objects or inherited relationships deduced. Also, the method comprises generating the object behavior model of the one or more engineering objects based on the determined relationships between each of the one or more classified engineering objects. The object behavior model is a knowledge graph representation of the one or more engineering objects superimposed with one or more behavioral information associated with the one or more engineering objects. The ontology schema comprises one or more rules associated with one or more relationships between the one or more engineering objects. The one or more rules may be syntax rules, semantic rules, program logic rules and the like.

In analyzing the behavior of the one or more engineering objects based on the generated object behavior model, the method comprises retrieving data and control parameters associated with the one or more physical components. The data and control parameters are key performance indicators comprising information relating to the technical installation 106, for example, sensor data, actuator data, environment data, network data, any automation data and the like. The method comprises comparing the retrieved data and control parameters associated with the one or more physical components with data and control parameters stored in the object behavior model. Further, the method comprises identifying deviation between the retrieved data and control parameters associated with the one or more physical components and the data and control parameters stored in the object behavior model. The method further comprises determining type of behavior of the one or more physical components corresponding to the identified deviation. The type of behavior comprises normal, abnormal, steady, and require maintenance. Also, the method comprises analyzing the behavior of the one or more engineering objects based on the determined type of behavior.

In modifying the one or more engineering objects in the engineering design based on the outcome of analysis of the behavior, the method comprises determining the one or more physical components the physical connections between the one or more physical components, and, the plurality of parameter values associated with the one or more physical components and the physical connections, required to be modified based on the outcome of the analysis of the behavior. Further, the method comprises determining type of modification to be performed on the determined one or more physical components, the physical connections between the one or more physical components, and, the plurality of parameter values associated with the one or more physical components (108A-N) and the physical connections. The type of modification comprises addition, deletion, replacement, revision, update, and the like. Further, the method comprises modifying the one or more physical components, the physical connections between the one or more physical components, g the plurality of parameter values associated with the one or more physical components and the physical connections based on the determined type of modification.

In an embodiment, the method may comprise generating a simulation instance for the modified engineering design representing an upgraded portion of the technical installation. Further, the method comprises simulating behavior of the upgraded portion of the technical installation in a simulation environment by executing the modified engineering design on the generated simulation instance. Also, the method comprises validating the behavior of the upgraded portion of the technical installation based on results of simulation.

In an embodiment, the method may comprise deploying the modified engineering design in real-time onto the one or more physical components installed in the technical installation based on the validation.

An aspect of embodiments of the present invention is also achieved by an engineering system for generating engineering designs. The engineering system comprises one or more processor(s) and a memory coupled to the processor. The memory comprises an automation module stored in the form of machine-readable instructions executable by the processor. The automation module is configured for performing the method as described above.

An aspect of embodiments of the present invention is also achieved by an industrial environment. The industrial environment comprising an engineering system, a technical installation comprising one or more physical components and one or more client devices communicatively coupled to the engineering system and the technical installation. The engineering system is configured to perform the above described method steps.

An aspect of embodiments of the present invention is also achieved by a computer-program product having machine-readable instructions stored therein, that when executed by one or more processor(s), cause the one or more processor(s) to perform method steps as described above.

The above-mentioned and other features of embodiments of the invention will now be addressed with reference to the accompanying drawings. The illustrated embodiments are intended to illustrate, but not limit the invention.

BRIEF DESCRIPTION

Some of the embodiments will be described in detail, with reference to the following figures, wherein like designations denote like members, wherein.

DETAILED DESCRIPTION

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

Figure 1:
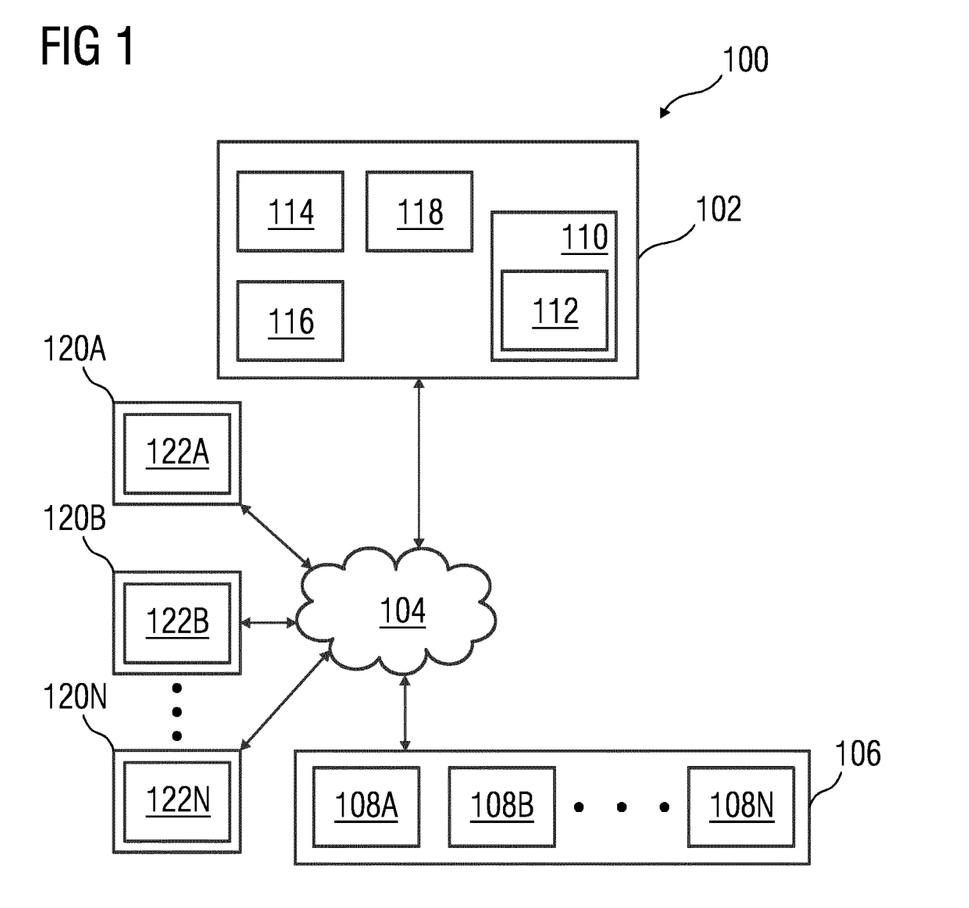
FIG. 1 is a block diagram of an industrial environment capable of generating engineering designs, according to an embodiment of the present invention.

FIG. 1 is a block diagram of an industrial environment 100 capable of generating engineering designs, according to an embodiment of the present invention. In FIG. 1, the industrial environment 100 includes an engineering system 102, a technical installation 106 and one or more client devices 120A-N. As used herein, "industrial environment" refers to a processing environment comprising configurable computing physical and logical resources, for example, networks, servers, storage, applications, services, etc., and data distributed over a platform, such as cloud computing platform. The industrial environment 100 provides on-demand network access to a shared pool of the configurable computing physical and logical resources. The engineering system 102 is communicatively connected to the technical installation 106 via the network 104 (such as Local Area Network (LAN), Wide Area Network (WAN), Wi-Fi, Internet, any short range or wide range communication). The engineering system 102 is also connected to the one or more client devices 120A-N via the network 104.

The engineering system 102 is connected to the one or more physical component(s) 108A-N in the technical installation 106 via the network 104. The one or more physical component(s) 108A-N may include servers, robots, switches, automation devices, programmable logic controllers (PLC)s, human machine interfaces (HMIs), motors, valves, pumps, actuators, sensors and other industrial equipment(s). The one or more physical component(s) 108A-N may be connected to each other or several other components (not shown in FIG. 1) via physical connections. The physical connections may be through wiring between the one or more physical component(s) 108A-N. Alternatively, the one or more physical component(s) 108A-N may also be connected via non-physical connections (such as Internet of Things (IoT)). Although, FIG. 1 illustrates the engineering system 102 connected to one technical installation 106, one skilled in the art can envision that the engineering system 102 can be connected to several technical installations 106 located at different geographical locations via the network 104.

The client devices 120A-N may be a desktop computer, laptop computer, tablet, smart phone and the like. Each of the client devices 120A-N is provided with an engineering tool 122A-N for generating and/or editing engineering designs respectively. The client devices 120A-N may enable users to download the engineering system version of the engineering design and create a client version of the engineering design. The client devices 120A-N can access the engineering system 102 for automatically generating engineering designs. In an embodiment, the client devices 120A-N comprises an engineering system capable of running an industrial automation application. The client devices 120A-N can access cloud applications (such as providing performance visualization of the one or more physical component(s) 108A-N via a web browser. Throughout the specification, the terms "client device" and "user device" are used interchangeably.

The engineering system 102 may be a standalone server deployed at a control station or may be a remote server on a cloud computing platform. In an embodiment, the engineering system 102 may be a cloud-based engineering system. The engineering system 102 is capable of delivering applications (such as cloud applications) for managing a technical installation 106 comprising one or more physical component(s) 108A-N. The engineering system 102 may comprise a platform 110 (such as a cloud computing platform), an automation module 112, a server 114 including hardware resources and an operating system (OS), a network interface 116 and a database 118. The network interface 116 enables communication between the engineering system 102, the technical installation 106, and the client device(s) 120A-N. The interface (such as cloud interface)(not shown in FIG. 1) may allow the engineers at the one or more client device(s) 120A-N to access engineering project files stored at the engineering system 102 and perform one or more actions on the engineering project files as same instance. The server 114 may include one or more servers on which the OS is installed. The servers 114 may comprise one or more processors, one or more storage devices, such as, memory units, for storing data and machine-readable instructions for example, applications and application programming interfaces (APIs), and other peripherals required for providing computing (such as cloud computing) functionality. The platform 110 enables functionalities such as data reception, data processing, data rendering, data communication, etc. using the hardware resources and the OS of the servers 114 and delivers the aforementioned services using the application programming interfaces deployed therein. The platform 110 may comprise a combination of dedicated hardware and software built on top of the hardware and the OS. In an exemplary embodiment, the platform 110 may correspond to an Integrated Development Environment (IDE) comprising program editors and compilers which allow the users of the client devices 120A-N to generate engineering designs. The platform 110 may further comprise an automation module 112 configured for generating engineering designs. Details of the automation module 112 are explained in FIG. 3 and FIG. 4.

The database 118 stores the information relating to the technical installation 106 and the client device(s) 120A-N. The database 118 is, for example, a structured query language (SQL) data store or a not only SQL (NoSQL) data store. In an exemplary embodiment, the database 118 may be configured as cloud-based database implemented in the industrial environment 100, where computing resources are delivered as a service over the platform 110. The database 118, according to another embodiment of the present invention, is a location on a file system directly accessible by the automation module 112. The database 118 is configured to store engineering project files, engineering designs, object behavior model, parameter values associated with the one or more physical component(s) 108A-N, test results, simulation results, status messages, one or more simulation instances, graphical programs, program logics, program logic patterns, engineering objects and engineering object properties, one or more engineering object blocks, relationship information between the engineering objects, requirements, program update messages and the like.

Figure 2:
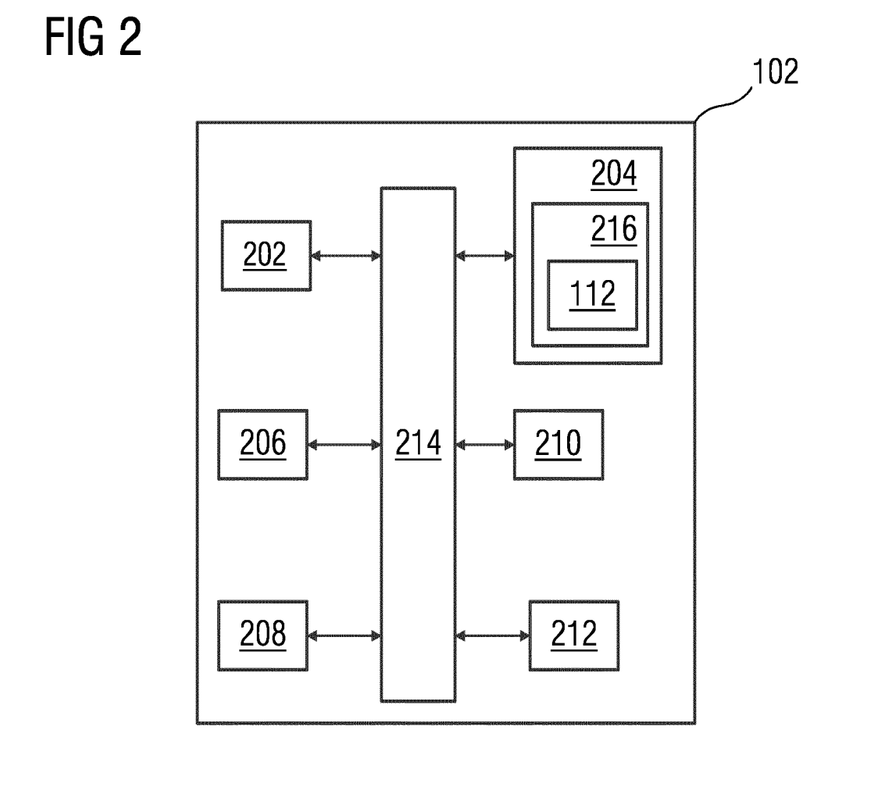
FIG. 2 is a block diagram of an engineering system, such as those shown in FIG. 1, in which an embodiment of the present invention can be implemented.

FIG. 2 is a block diagram of an engineering system 102, such as those shown in FIG. 1, in which an embodiment of the present invention can be implemented. In FIG. 2, the engineering system 102 includes a processor(s) 202, an accessible memory 204, a storage unit 206, a communication interface 208, an input-output unit 210, a network interface 212 and a bus 214.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes an integrated development environment (IDE) 216. The IDE 216 includes an automation module 112 stored in the form of machine-readable instructions on any of the above-mentioned storage media and may be in communication with and executed by the processor(s) 202.

When executed by the processor(s) 202, the automation module 112 causes the processor(s) 202 to generate engineering designs in the engineering system 102. In an embodiment, the automation module 112 causes the processor(s) 202 to receive an engineering design of a technical installation 106. The engineering design comprises one or more engineering objects representing one or more physical components 108A-N in the technical installation 106. The one or more engineering objects comprises one or more physical components 108A-N in a portion of the technical installation 106, physical connections between the one or more physical components 108A-N, and a plurality of parameter values associated with the one or more physical components 108A-N and the physical connections. Upon receiving the engineering design of the technical installation 106, the automation module 112 causes the processor(s) 202 to generate an object behavior model of the one or more engineering objects based on an ontology schema. The object behavior model is a knowledge graph based representation of the one or more engineering objects superimposed with one or more behavioral information associated with the one or more engineering objects. The object behavior model is generated based on the learnings from previously generated engineering designs. The object behavior model creates an opportunity for poorly maintained program blocks with inconsistent quality and without any enhancement footprint to look back to and helps in further improvements of the engineering design. The learnings are obtained using any machine learning or artificial intelligence analysis method. For example, given a graphical program, the program logic, tokens, keywords, syntax, semantics, data structures associated with the graphical program are learnt and stored in the database 118 in the form of a trained program table.

The ontology schema comprises one or more rules associated with one or more relationships between the one or more engineering objects. Specifically, the representation of one or more physical components 108A-N in the portion of the technical installation 106, the physical connections between the one or more physical components 108A-N, and the plurality of parameter values associated with the one or more physical components 108A-N and the physical connections which are comprised in the engineering design are configured in the engineering system 102 using a respective graphical program. Each graphical program comprises a program logic associated with each of the one or more physical components 108A-N, the physical connections between the one or more physical components 108A-N and the plurality of parameter values. A user of the client device(s) 120A-N modifies the graphical program corresponding to components using the engineering tool 122A-N.

Further, the automation module 112 causes the processor(s) 202 to analyze behavior of the one or more engineering objects based on the generated object behavior model. Further, the automation module 112 causes the processor 202 to modify the one or more engineering objects in the engineering design based on the outcome of analysis of the behavior. Furthermore, the automation module 112 causes the processor(s) 202 to output the modified engineering design of the technical installation 106. The modified engineering design represents an upgraded portion of the technical installation 106. The upgraded portion of the technical installation 106 comprises a change in the one or more physical components 108A-N, the physical connections and the parameter values. The modified engineering design is different from the received engineering design. Specifically, the modified engineering design comprises a modified representation of the modified one or more physical components 108A-N in the upgraded portion of the technical installation 106, modified physical connections between the modified one or more physical components 108A-N, and a modified plurality of parameter values associated with the modified one or more physical components 108A-N and the modified physical connections.

In generating the object behavior model of the one or more engineering objects based on the ontology schema, the automation module 112 causes the processor(s) 202 to identifying one or more engineering objects based on type of the one or more physical components 108A-N, one or more physical connections between the one or more physical components 108A-N, and a plurality of parameter values associated with the one or more physical components 108A-N and the physical connections. This is achieved by analyzing a graphical program associated with an engineering object structurally in terms of, control flow, data flow, data usage. Specifically, property values embedded in all engineering objects are read in order to analyze the graphical program associated with the engineering object. Further, the automation module 112 causes the processor(s) 202 to classify the identified one or more engineering objects into one or more engineering object blocks based on a unique identifier associated with each of the one or more identified engineering objects. Also, the automation module 112 causes the processor(s) 202 to determine one or more engineering object properties associated with each of the classified one or more engineering objects. Also, the automation module 112 causes the processor(s) 202 to determine relationship between each of the one or more classified engineering objects based on the ontology schema table. Further, the automation module 112 causes the processor(s) 202 to generate the object behavior model of the one or more engineering objects based on the determined relationships between each of the one or more classified engineering objects.

In analyzing the behavior of the one or more engineering objects based on the generated object behavior model, the automation module 112 causes the processor(s) 202 to retrieve data and control parameters associated with the one or more physical components 108A-N. Further, the automation module 112 causes the processor(s) 202 to compare the retrieved data and control parameters associated with the one or more physical components 108A-N with data and control parameters stored in the object behavior model. Further, the automation module 112 causes the processor(s) 202 to identify deviation between the retrieved data and control parameters associated with the one or more physical components 108A-N and the data and control parameters stored in the object behavior model. Also, the automation module 112 causes the processor(s) 202 to determine type of behavior of the one or more physical components 108A-N corresponding to the identified deviation. The type of behavior comprises normal, abnormal, steady, and require maintenance and the like. Also, the automation module 112 causes the processor(s) 202 to analyze the behavior of the one or more engineering objects based on the determined type of comparison.

In modifying the one or more engineering objects in the engineering design based on the outcome of analysis of the behavior, the automation module 112 causes the processor(s) 202 to determine the one or more physical components 108A-N, the physical connections between the one or more physical components 108A-N, and, the plurality of parameter values associated with the one or more physical components 108A-N and the physical connections, required to be modified based on the outcome of the analysis of the behavior. The outcome of analysis of the behavior include behavior information for each of the engineering objects and also indicate those engineering objects that require modification. Also, the automation module 112 causes the processor(s) 202 to determine type of modification to be performed on the determined one or more physical components (108A-N), the physical connections between the one or more physical components (108A-N), and, the plurality of parameter values associated with the one or more physical components (108A-N) and the physical connections. The type of modification comprises addition, deletion, replacement, revision, update, and the like. Furthermore, the automation module 112 causes the processor(s) 202 to modify the one or more physical components 108A-N, the physical connections between the one or more physical components 108A-N, the plurality of parameter values associated with the one or more physical components 108A-N and the physical connections based on the determined type of modification.

Further, the automation module 112 causes the processor(s) 202 to generate a simulation instance for the modified engineering design representing the upgraded portion of the technical installation 106. Further, the automation module 112 causes the processor(s) 202 to simulate behavior of the upgraded portion of the technical installation 106 in a simulation environment by executing the modified engineering design on the generated simulation instance. Also, the automation module 112 causes the processor(s) 202 to validate the behavior of the upgraded portion of the technical installation 106 based on results of simulation. Furthermore, the automation module 112 causes the processor(s) 202 to deploy the modified engineering design in real-time onto the one or more physical components 108A-N installed in the technical installation 106 based on the validation results.

The storage unit 206 may be a non-transitory storage medium configured for storing a database (such as database 118) which comprises server version of the engineering designs.

The communication interface 208 is configured for establishing communication sessions between the one or more client devices 120A-N and the engineering system 102. The communication interface 208 allows the one or more engineering applications running on the client devices 120A-N to import/import engineering project files into the engineering system 102. In an embodiment, the communication interface 208 interacts with the interface at the one or more client devices 120A-N for allowing the engineers to access the engineering designs associated with an engineering project file and perform one or more actions on the engineering designs stored in the engineering system 102.

The input-output unit 210 may include input devices a keypad, touch-sensitive display, camera (such as a camera receiving gesture-based inputs), etc. capable of receiving one or more input signals, such as user commands to process engineering project file. Also, the input-output unit 210 may be a display unit for displaying a graphical user interface which visualizes the behavior model associated with the modified engineering designs and also displays the status information associated with each set of actions performed on the graphical user interface. The set of actions may include execution of predefined tests, download, compile and deploy of graphical programs.

The bus 214 acts as interconnect between the processor 202, the memory 204, and the input-output unit 210.

The network interface 212 may be configured to handle network connectivity, bandwidth and network traffic between the engineering system 102, client devices 120A-N and the technical installation 106.

Those of ordinary skilled in the art will appreciate that the hardware depicted in FIG. 2 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of an engineering system 102 as is unique to the present disclosure or necessary for an understanding of the present disclosure is depicted and described. The remainder of the construction and operation of the engineering system 102 may conform to any of the various current implementation and practices known in the art.

Figure 3:
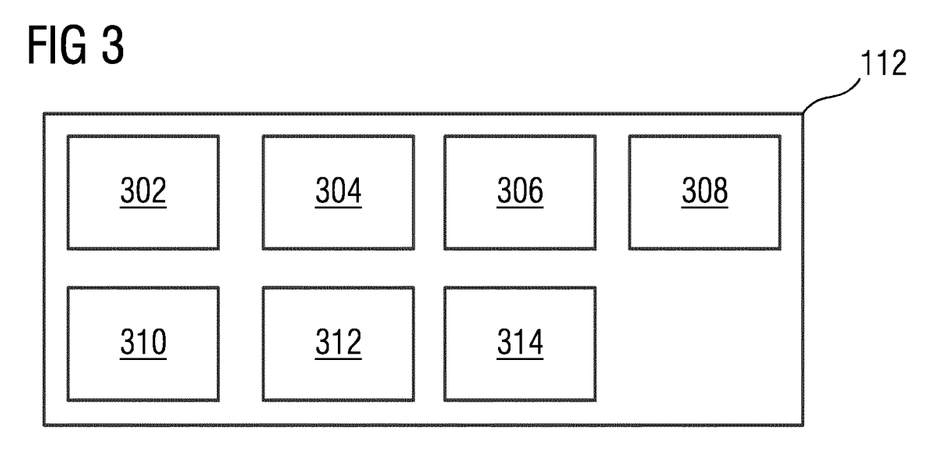
FIG. 3 is a block diagram of an automation module, such as those shown in FIG. 2, in which an embodiment of the present invention can be implemented.

FIG. 3 is a block diagram of an automation module 112, such as those shown in FIG. 2, in which an embodiment of the present invention can be implemented. In FIG. 3, the automation module 112 comprises a request handler module 302, an object behavior model generation module 304, an analysis module 306, a modifier module 308, an engineering object database 310, a validation module 312 and a deployment module 314.

The request handler module 302 is configured for receiving the engineering design of a technical installation 106. The engineering design comprises one or more engineering objects representing one or more physical components 108A-N in the technical installation 106. The one or more engineering objects comprises one or more physical components 108-N in a portion of the technical installation 106, physical connections between the one or more physical components 108A-N, and a plurality of parameter values associated with the one or more physical components 108A-N and the physical connections. The received engineering design comprises information related to the one or more physical components 108A-N, physical connections between the one or more physical components 108A-N, and a plurality of parameter values associated with the one or more physical components 108A-N and the physical connections. For example, the engineering design is received from one of the one or more users external to the industrial environment 100 via a network. In alternative embodiment, the engineering design is received from the one or the one or more client devices 120A-N via the network.

In an embodiment, the representation of one or more physical components 108A-N in the portion of the technical installation 106, physical connections between the one or more physical components 108A-N, and a plurality of parameter values associated with the one or more physical components 108A-N and the physical connections, which are comprised in the received engineering design may be configured in the engineering system 102 using a respective graphical program. Each graphical program comprises a program logic associated with each of the one or more physical components 108A-N, physical connections between the one or more physical components 108A-N and the plurality of parameter values.

The object behavior model generation module 304 is configured for generating an object behavior model of the one or more engineering objects based on an ontology schema. In an embodiment, the object behavior model may be a knowledge graph based representation of the one or more engineering objects superimposed with one or more behavioral information associated with the one or more engineering objects. The object behavior model also comprises data and control parameters associated with the one or more physical components 108A-N. Further, the ontology schema comprises one or more rules associated with one or more relationships between the one or more engineering objects. To generate the object behavior model, the object behavior model generation module 304 is configured for identifying one or more engineering objects based on type of the one or more physical components 108A-N, one or more physical connections between the one or more physical components 108A-N, and a plurality of parameter values associated with the one or more physical components 108A-N and the physical connections. The type of the one or more engineering objects comprises function blocks, function calls, data blocks, user defined data types, Programmable logic controller (PLCs), hardware configuration, parameter values, and the like. Each of the one or more engineering objects are associated with a unique identifier. The step of identification is achieved by analyzing a graphical program associated with an engineering object structurally in terms of, control flow, data flow, data usage. Specifically, property values embedded in all engineering objects are read in order to analyze the graphical program associated with the engineering object. Then, the object behavior model generation module 304 is configured for classifying the identified one or more engineering objects into one or more engineering object blocks based on a unique identifier associated with each of the one or more identified engineering objects. Each of the one or more engineering object blocks comprises a set of defined actions to be performed. The one or more engineering object blocks comprises program variable block, domain block, component level block, configuration information block, subcomponent level block, program logic block, function block and the like. The set of actions to be performed is stored across respective one or more engineering object blocks as a hash table in the database 118. For example, if the type of the engineering object is a specific type of motor, then such specific type of a motor is classified under the engineering object block "motor". Similarly, if the type of the engineering object is a physical communication link cable between two physical components 108A-N, then the physical communication link cable is classified under "physical connections" and the like. The unique identifiers associated with such one or more engineering objects help in classifying them into respective one or more engineering object block. Exemplary engineering object block category comprises basic block category, variable and statement category, statement category and the like. Below table 1 represents an exemplary representation of engineering object category being variables/symbols:

TABLE 1

| Object Category: Variables/Symbols | |
|---|---|
| Object ID | Properties |
| Var.obj1 | Interface Type: INPUT<br>Variable Name: Input_1<br>Data Type: INT |
| Var.obj2 | Interface Type: INPUT<br>Variable Name: Input_2<br>Data Type: INT |
| Var.obj3 | Interface Type: TEMP<br>Variable Name: Temp_1<br>Data Type: DINT |
| Var.obj4 | Interface Type: TEMP<br>Variable Name: Temp_2<br>Data Type: DINT |
| Var.obj5 | Interface Type: TEMP<br>Variable Name: i<br>Data Type: INT |
| Var.Obj6 | Interface Type: TEMP<br>Variable Name: Temp_3<br>Data Type: ARRAY<br>Inner Data Type: BOOL<br>Lower Index: 1<br>Higher Index: 5 |

Below table 2 represents an exemplary representation of engineering object category being statements:

TABLE 2

Object Category: Statements

| Object ID | Properties |
| --- | --- |
| Stmt.Obj1 | Statement Type: EXPRESSION<br>Statement: Temp_1 = Input_1 + Input_2;<br>Variables Defined: Temp_1<br>Variables Used: {Input_1, Input_2} |
| Stmt.Obj2 | Statement Type: EXPRESSION<br>Statement: Temp_1 = Temp_1 + Temp_4;<br>Variables Defined: Temp_1<br>Variables Used: {Temp_1, Temp_4} |
| Stmt.Obj3 | Statement Type: CONDITIONAL_IF<br>Statement: IF (Temp_1 = 10)<br>Variables Defined: NULL<br>Variables Used: {Temp_1} |
| Stmt.Obj4 | Statement Type: EXPRESSION<br>Statement: Temp_3[i] = TRUE;<br>Variables Defined: NULL<br>Variables Used: {Temp_3, i}<br>Additional Information: {<br>ARRAY usage: Temp_3<br>Index Variable: i<br>} |
| Stmt.Obj5 | Statement Type: EXPRESSION<br>Statement: Temp_2 = 0;<br>Variables Defined: Temp_2 |

Below Table 3 represents an exemplary representation of engineering object category being basic blocks:

TABLE 3

Object Category: Basic Blocks

| Object ID | Properties |
| --- | --- |
| BB.Obj1 | Basic Block Type: LINEAR<br>Statements: { Stmt.Obj1, Stmt.Obj2}<br>Variables Defined: {Temp_1}<br>Variables Used: {Input_1, Input_2, Temp_1, Temp_4}<br>Predecessor Block: {NULL}<br>Successor: {BB.Obj2} |
| BB.Obj2 | Basic Block Type: CONDITIONAL<br>Statements: {Stmt.Obj3}<br>Variables Used: {Temp_1}<br>Predecessor Block: {BB.Obj1}<br>Successor: {BB.Obj3, BB.Obj4}<br>True Path Successor: {BB.Obj3}<br>False Path Successor: {BB.Obj4} |
| BB.Obj3 | Basic Block Type: LINEAR<br>Statements: { Stmt.Obj4}<br>Variables Defined: {Temp_3}<br>Variables Used: {i}<br>Predecessor Block: {BB.Obj2}<br>Successor: {NULL}<br>Additional Information: {ARRAY usage} |
| BB.Obj4 | Basic Block Type: LINEAR<br>Statements: { Stmt.Obj5}<br>Variables Defined: {Temp_2}<br>Variables Used: {NULL}<br>Predecessor Block: {BB.Obj2}<br>Successor: {NULL} |

Further, the object behavior model generation module 304 is configured for determining one or more engineering object properties associated with each of the classified one or more engineering objects. The object properties are object's domain context, association and relationship with other engineering objects, object size, object identifier, type of engineering object, and the like. Such object properties are determined for each of the one or more engineering objects. Such determination using ontology enables engineering object elicitation & generalization, defines property & relationship between the engineering objects.

When once the object properties are determined, the object behavior model generation module 304 is configured for determining relationship between each of the one or more classified engineering objects based on the ontology schema table. Based on the determined relationships between each of the one or more classified engineering objects, the object behavior model generation module 304 is configured for generating the object behavior model of the one or more engineering objects.

In an embodiment, the object behavior model generation module 304 is also configured for managing the graphical programs corresponding to each of the one or more physical components 108A-N, physical connections between the one or more physical components 108A-N, and a plurality of parameter values associated with the one or more physical components 108A-N and the physical connections. A graphical program comprises a program logic. Each graphical program comprises a set of programmable instructions or statements corresponding to the program logic. Each graphical program may correspond to a function block under an engineering design. The engineering design may comprise several such function blocks. The users at the client devices 120A-N uses the engineering tool 122A-N in order to design or develop engineering designs by coding each of these graphical programs.

The analysis module 306 is configured for analyzing behavior of the one or more engineering objects based on the generated object behavior model. Specifically, the analysis module 306 is configured for retrieving data and control parameters associated with the one or more physical components 108A-N. The data and control parameters are key performance indicators comprising information relating to the technical installation 106, for example, sensor data, actuator data, environment data, network data, any automation data and the like. Further, the analysis module 306 is configured for comparing the retrieved data and control parameters associated with the one or more physical components 108A-N with data and control parameters stored in the object behavior model. Furthermore, the analysis module 306 is configured for identifying deviation between the retrieved data and control parameters associated with the one or more physical components 108A-N and the data and control parameters stored in the object behavior model. The deviation indicates a difference between the retrieved data and control parameters, and the data and control parameters stored in the object behavior model. Also, the analysis module 306 is configured for determining type of behavior of the one or more physical components 108A-N corresponding to the identified deviation. The type of behavior comprises normal, abnormal, steady, and require maintenance and the like. Furthermore, the analysis module 306 is configured for analyzing the behavior of the one or more engineering objects based on the determined type of behavior.

The modifier module 308 is configured for modifying the one or more engineering objects in the engineering design based on the outcome of analysis of the behavior. The outcome of analysis of the behavior may be a behavior report indicating whether behavior or characteristic of each engineering objects as defined in the object behavior model is acceptable, improvised, enhanced, optimized or the like. Also, the outcome of analysis of the behavior include behavior information for each of the engineering objects and also indicate those engineering objects that require modification. Specifically, the modifier module 308 is configured for determining the one or more physical components 108A-N, the physical connections between the one or more physical components 108A-N, and, the plurality of parameter values associated with the one or more physical components 108A-N and the physical connections, required to be modified based on the outcome of the analysis of the behavior. Further, the modifier module 308 is configured for determining type of modification to be performed on the determined one or more physical components 108A-N, the physical connections between the one or more physical components 108A-N, and, the plurality of parameter values associated with the one or more physical components 108A-N and the physical connections. The type of modification comprises addition, deletion, replacement, revision, update, and the like. Also, the modifier module 308 is configured for modifying the one or more physical components 108A-N, the physical connections between the one or more physical components 108A-N, the plurality of parameter values associated with the one or more physical components 108A-N and the physical connections based on the determined type of modification. The modification comprises any change in the parameter values and/or object properties associated with the one or more engineering objects. For example, the original motor in the engineering design may be replaced with a new motor with new configuration parameters. Similarly, a port in an input-output module may be modified. In an embodiment, a modification may correspond to addition, deletion, replacement, revision or update to the one or more engineering objects.

The engineering object database 310 is configured for generating an engineering object library comprising the generated object behavior models, one or more physical components 108A-N, physical connections between the one or more physical components 108A-N, and a plurality of parameter values associated with the one or more physical components 108A-N and the physical connections. The engineering object database 310 is configured for continuously updating the engineering object library with updated versions of the engineering designs. Also, the engineering object database 310 is configured for maintaining the engineering object library in an ontology schema.

The validation module 312 is configured for generating a simulation instance for the modified engineering design representing an upgraded portion of the technical installation 106. Further, the validation module 312 is configured for simulating behavior of the upgraded portion of the technical installation 106 in a simulation environment by executing the modified engineering design on the generated simulation instance. The upgraded portion of the technical installation 106 comprises a change in the one or more physical components 108A-N, the physical connections and the parameter values. The simulation environment emulates an actual technical installation, such as technical installation 106. Further, the simulation environment may be a virtual setup of the actual technical installation 106. Also, the validation module 312 is configured for validating the behavior of the upgraded portion of the technical installation 106 based on results of simulation. The results of simulation may indicate success or failure of the modified engineering design if deployed in the technical installation 106.

The deployment module 314 is configured for deploying the modified engineering design in real-time onto the one or more physical components 108A-N installed in the technical installation 106 based on the validation. If the validation results are positive, then the modified engineering design is deployed in real time into the upgraded portion of the technical installation 106. If the validation results are negative, then the causes of the negative validation report are generated as a report and displayed to the user to re-design or re-modify the engineering design.

Figure 4:
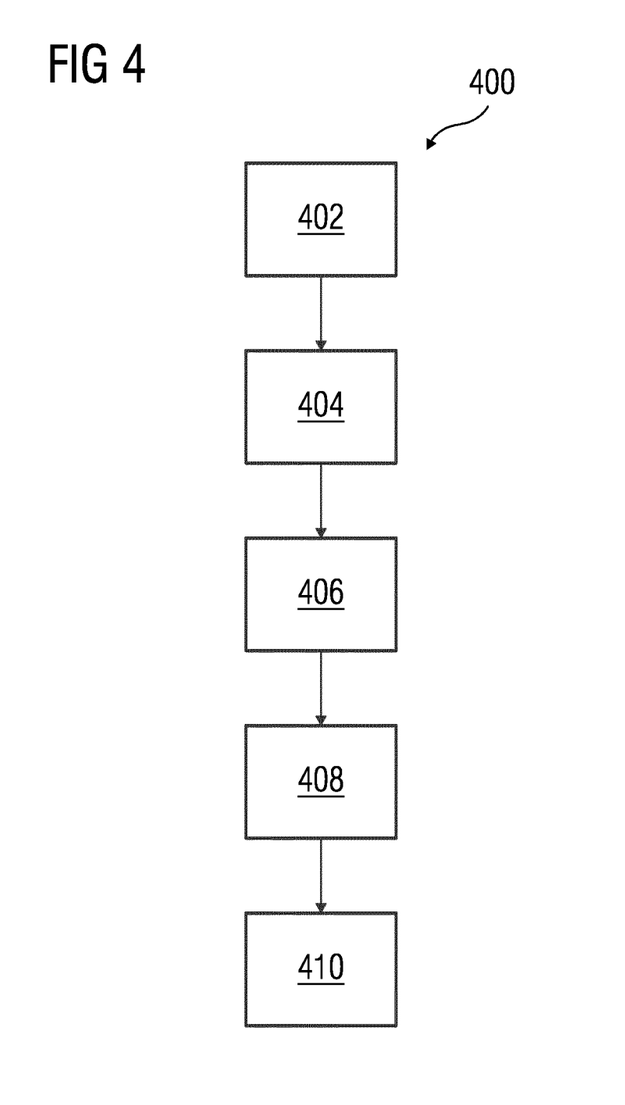
FIG. 4 is a process flowchart illustrating an exemplary method of generating engineering designs in an engineering system, according to an embodiment of the present invention.

FIG. 4 is a process flowchart illustrating an exemplary method 400 of generating engineering designs in an engineering system 102, according to an embodiment of the present invention. At step 402, an engineering design of a technical installation 106 is received. The engineering design comprises one or more engineering objects representing one or more physical components 108A-N in the technical installation 106. The one or more engineering objects comprises one or more physical components 108A-N in a portion of the technical installation 106, physical connections between the one or more physical components 108A-N, and a plurality of parameter values associated with the one or more physical components 108A-N and the physical connections.

At step 404, an object behavior model of the one or more engineering objects is generated based on an ontology schema. The object behavior model is a knowledge graph representation of the one or more engineering objects superimposed with one or more behavioral information associated with the one or more engineering objects. The ontology schema comprises one or more rules associated with one or more relationships between the one or more engineering objects. The one or more rules comprises syntax rules, semantic rules, program logic rules and the like.

At step 406, behavior of the one or more engineering objects is analyzed based on the generated object behavior model. At step 408, the one or more engineering objects in the engineering design are modified based on the outcome of analysis of the behavior. At step 410, the modified engineering design of the technical installation 106 is outputted.

Figure 5:
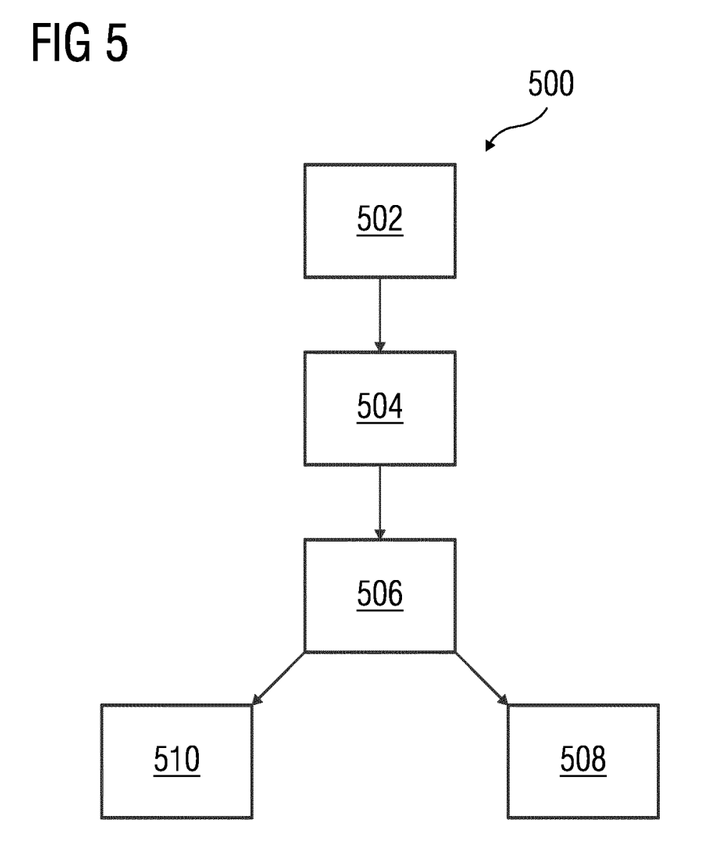
FIG. 5 is a process flowchart illustrating an exemplary method of generating object behavior model, according to an embodiment of the present invention.

FIG. 5 is a process flowchart illustrating an exemplary method 500 of generating object behavior model, according to an embodiment of the present invention. At step 502, type of engineering objects and its associated data are identified. Then, at step 504, first engineering object block is determined by parsing the engineering objects in engineering design. Furthermore, at step 506, a second engineering object block is determined similarly. For example, the first engineering object block may be for conditional data type and the second engineering object block may be for linear data type or vice versa. At step 508 and 510, third and fourth engineering object blocks are determined respectively. The third and fourth engineering object blocks may be for example another set of engineering objects in the engineering design. Each of the engineering object block may comprise an object identifier mapped to corresponding engineering object properties. An exemplary representation of engineering object blocks are illustrated in Table 3 as above. Further, the above mentioned exemplary method is described in view of below exemplary program block associated with an engineering object:

Program 1: Sample SCL Program
    FUNCTION_BLOCK "Block1"
    VAR_INPUT
    Input_1: INT;
    Input_2: INT;
    END_VAR
    VAR_TEMP
    Temp_1: DINT;
    Temp_2: DINT;
    i: INT;
    Temp_3: ARRAY[1 . . . 5] OF BOOL;
    END_VAR
    BEGIN Temp_1=Input_1+Input_2;
Temp_1=Temp_1+Temp_4;
IF(Temp_1=10)
Temp_3[i]=TRUE;
ELSE
Temp_2=0;
END_IF;
END_FUNCTION_BLOCK
Program 1

The above derived object behavior model of the engineering program block will get mapped to the respective ontology schema defined by the program ontology (PO).

Figure 6A:
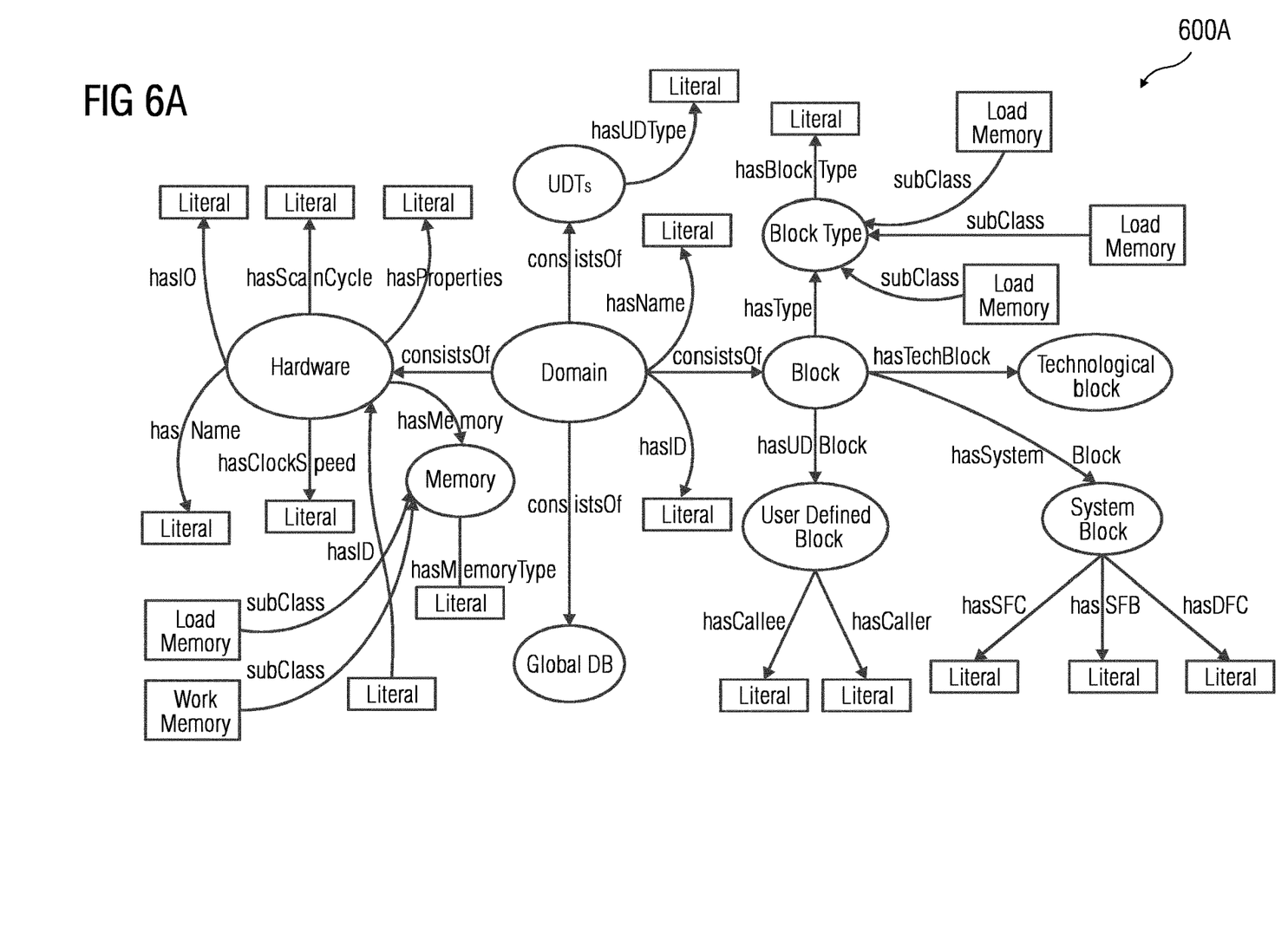
FIG. 6A is a schematic representation of an exemplary object behavior model, according to an embodiment of the present invention.
Figure 6B:
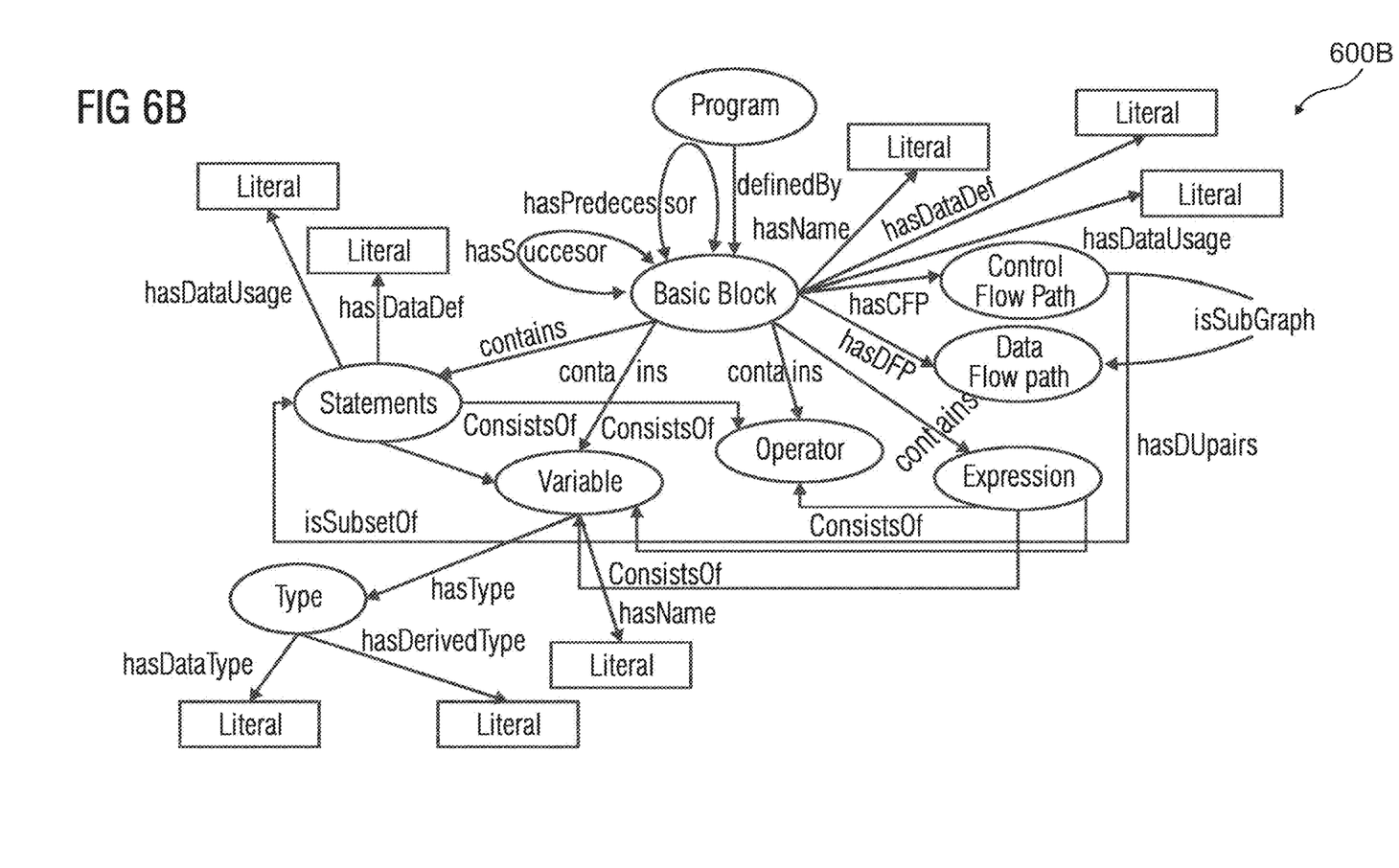
FIG. 6B is a schematic representation of an exemplary object behavior model, according to an embodiment of the present invention

FIGS. 6A-B are a schematic representation of an exemplary object behavior model, according to an embodiment of the present invention. In FIG. 6A, an exemplary International Electrotechnical Commission Programming Languages (IECPL) domain model ontology is depicted. The IECPL domain ontology is a type of the object behavior model generated. The IECPL domain ontology is a knowledge graph representation of various basic engineering object blocks such as user defined block, technology block, hardware block, and so on. The IECPL domain model ontology provides a complete overview of the IECPL program logic through which the behavior of the modified engineering design may be thoroughly and efficiently analyzed and task performed by various modified engineering objects in the modified engineering design may be deduced. Further, in FIG. 6B, an exemplary program ontology for any program using data and control parameters are depicted. The program ontology depicts knowledge graph representation of various object categories along with its respective data and control flow paths.

Embodiments of the present invention can take a form of a computer program product comprising program modules accessible from computer-usable or computer-readable medium storing program code for use by or in connection with one or more computers, processors, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology can be centralized or distributed (or a combination thereof) as known to those skilled in the art.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for generating engineering designs in an industrial environment, the method comprising:

receiving, by a processor, an engineering design of a technical installation, wherein the engineering design comprises one or more engineering objects representing one or more physical components in the technical installation and wherein the one or more engineering objects comprises information about the one or more physical components in a portion of the technical installation, physical connections between the one or more physical components, and a plurality of parameter values associated with the one or more physical components and the physical connections;

generating, by the processor, an object behavior model of the one or more engineering objects based on an ontology schema, wherein the object behavior model of the one or more engineering objects comprises information about a plurality of key performance indicators associated with the technical installation;

analyzing, by the processor, behavior of the one or more engineering objects based on the generated object behavior model;

generating a modified engineering design by modification, by the processor, of the one or more engineering objects in the engineering design based on an outcome of analysis of the behavior; and outputting, by the processor, the modified engineering design of the technical installation;

wherein generating the object behavior model of the one or more engineering objects based on the ontology schema includes identifying one or more engineering objects based on type of the one or more physical components, one or more physical connections between the one or more physical components, and a plurality of parameter values associated with the one or more physical components and the physical connections; classifying the identified one or more engineering objects into one or more engineering object blocks based on a unique identifier associated with each of the one or more identified engineering objects; determining one or more engineering object properties associated with each of the classified one or more engineering objects; determining relationship between each of the one or more classified engineering objects based on an ontology schema table; and generating the object behavior model of the one or more engineering objects based on the determined relationships between each of the one or more classified engineering objects; and/or wherein analyzing the behavior of the one or more engineering objects based on the generated object behavior model includes retrieving data and control parameters associated with the one or more physical components from the received engineering design; comparing the retrieved data and control parameters associated with the one or more physical components with data and control parameters stored in the object behavior model; identifying deviation between the retrieved data and control parameters associated with the one or more physical components and the data and control parameters stored in the object behavior model; determining type of behavior of the one or more physical components corresponding to the identified deviation, wherein the type of behavior comprises normal, abnormal, steady, and require maintenance; and analyzing the behavior of the one or more engineering objects based on the determined type of behavior; and/or wherein modifying the one or more engineering objects in the engineering design based on the outcome of analysis of the behavior includes determining the one or more physical components, the physical connections between the one or more physical components, and, the plurality of parameter values associated with the one or more physical components and the physical connections, required to be modified based on the outcome of the analysis of the behavior; determining type of modification to be performed on the determined one or more physical components, the physical connections between the one or more physical components, and, the plurality of parameter values associated with the one or more physical components and the physical connections; and modifying the one or more physical components, the physical connections between the one or more physical components, the plurality of parameter values associated with the one or more physical components and the physical connections based on the determined type of modification.

2. The method according to claim 1, wherein the object behavior model is a knowledge graph based representation of the one or more engineering objects superimposed with one or more behavioral information associated with the one or more engineering objects.

3. The method according to claim 1, wherein the ontology schema comprises one or more rules associated with one or more relationships between the one or more engineering objects.

4. The method according to claim 1, further comprising:
generating a simulation instance for the modified engineering design representing an upgraded portion of the technical installation; and
simulating behavior of the upgraded portion of the technical installation in a simulation environment by executing the modified engineering design on the generated simulation instance; and
validating the behavior of the upgraded portion of the technical installation based on results of simulation.

5. The method according to claim 1, further comprising:
deploying the modified engineering design in real-time onto the one or more physical components installed in the technical installation based on the validation.

6. An engineering system for generating engineering designs in an industrial environment, wherein the engineering system comprises:
one or more processors; and
a memory coupled to the one or more processors, wherein the memory comprises an automation module stored in the form of machine-readable instructions executable by the one or more processors, wherein the automation module is configured to:
receive an engineering design of a technical installation, wherein the engineering design comprises one or more engineering objects representing one or more physical components in the technical installation and wherein the one or more engineering objects comprises information about the one or more physical components in a portion of the technical installation, physical connections between the one or more physical components, and a plurality of parameter values associated with the one or more physical components and the physical connections;
generate an object behavior model of the one or more engineering objects based on an ontology schema, wherein the object behavior model of the one or more engineering objects comprises information about a plurality of key performance indicators associated with the technical installation;
analyze behavior of the one or more engineering objects based on the generated object behavior model;
generate a modified engineering design by modification, by the processor, of the one or more engineering objects in the engineering design based on an outcome of analysis of the behavior; and
output the modified engineering design of the technical installation;
wherein generating the object behavior model of the one or more engineering objects based on the ontology schema includes identifying one or more engineering objects based on type of the one or more physical components, one or more physical connections between the one or more physical components, and a plurality of parameter values associated with the one or more physical components and the physical connections; classifying the identified one or more engineering objects into one or more engineering object blocks based on a unique identifier associated with each of the one or more identified engineering objects; determining one or more engineering object properties associated with each of the classified one or more engineering objects; determining relationship between each of the one or more classified engineering objects based on an ontology schema table; and generating the object behavior model of the one or more engineering objects based on the determined relationships between each of the one or more classified engineering objects; and/or
wherein analyzing the behavior of the one or more engineering objects based on the generated object behavior model includes retrieving data and control parameters associated with the one or more physical components from the received engineering design; comparing the retrieved data and control parameters associated with the one or more physical components with data and control parameters stored in the object behavior model; identifying deviation between the retrieved data and control parameters associated with the one or more physical components and the data and control parameters stored in the object behavior model; determining type of behavior of the one or more physical components corresponding to the identified deviation, wherein the type of behavior comprises normal, abnormal, steady, and require maintenance; and analyzing the behavior of the one or more engineering objects based on the determined type of behavior; and/or
wherein modifying the one or more engineering objects in the engineering design based on the outcome of analysis of the behavior includes determining the one or more physical components, the physical connections between the one or more physical components, and, the plurality of parameter values associated with the one or more physical components and the physical connections, required to be modified based on the outcome of the analysis of the behavior; determining type of modification to be performed on the determined one or more physical components, the physical connections between the one or more physical components, and, the plurality of parameter values associated with the one or more physical components and the physical connections; and modifying the one or more physical components, the physical connections between the one or more physical components, the plurality of parameter values associated with the one or more physical components and the physical connections based on the determined type of modification.

7. A computer-program product, having machine-readable instructions stored therein, that when executed by a processors, cause the processors to perform a method comprising:

receiving, by a processor, an engineering design of a technical installation, wherein the engineering design comprises one or more engineering objects representing one or more physical components in the technical installation and wherein the one or more engineering objects comprises information about the one or more physical components in a portion of the technical installation, physical connections between the one or more physical components, and a plurality of parameter values associated with the one or more physical components and the physical connections;

generating, by the processor, an object behavior model of the one or more engineering objects based on an ontology schema, wherein the object behavior model of the one or more engineering objects comprises information about a plurality of key performance indicators associated with the technical installation;

analyzing, by the processor, behavior of the one or more engineering objects based on the generated object behavior model;

generating a modified engineering design by modification, by the processor, of the one or more engineering objects in the engineering design based on an outcome of analysis of the behavior; and outputting, by the processor, the modified engineering design of the technical installation;

wherein generating the object behavior model of the one or more engineering objects based on the ontology schema includes identifying one or more engineering objects based on type of the one or more physical components, one or more physical connections between the one or more physical components, and a plurality of parameter values associated with the one or more physical components and the physical connections; classifying the identified one or more engineering objects into one or more engineering object blocks based on a unique identifier associated with each of the one or more identified engineering objects; determining one or more engineering object properties associated with each of the classified one or more engineering objects; determining relationship between each of the one or more classified engineering objects based on an ontology schema table; and generating the object behavior model of the one or more engineering objects based on the determined relationships between each of the one or more classified engineering objects; and/or wherein analyzing the behavior of the one or more engineering objects based on the generated object behavior model includes retrieving data and control parameters associated with the one or more physical components from the received engineering design; comparing the retrieved data and control parameters associated with the one or more physical components with data and control parameters stored in the object behavior model; identifying deviation between the retrieved data and control parameters associated with the one or more physical components and the data and control parameters stored in the object behavior model; determining type of behavior of the one or more physical components corresponding to the identified deviation, wherein the type of behavior comprises normal, abnormal, steady, and require maintenance; and analyzing the behavior of the one or more engineering objects based on the determined type of behavior; and/or wherein modifying the one or more engineering objects in the engineering design based on the outcome of analysis of the behavior includes determining the one or more physical components, the physical connections between the one or more physical components, and, the plurality of parameter values associated with the one or more physical components and the physical connections, required to be modified based on the outcome of the analysis of the behavior; determining type of modification to be performed on the determined one or more physical components, the physical connections between the one or more physical components, and, the plurality of parameter values associated with the one or more physical components and the physical connections; and modifying the one or more physical components, the physical connections between the one or more physical components, the plurality of parameter values associated with the one or more physical components and the physical connections based on the determined type of modification.

* * * * *